United States Patent
Dotan et al.

(10) Patent No.: US 9,305,151 B1
(45) Date of Patent: Apr. 5, 2016

(54) RISK-BASED AUTHENTICATION USING LOCKOUT STATES

(71) Applicant: EMC Corporation, Hopkinton, MA (US)

(72) Inventors: Yedidya Dotan, Newton, MA (US); Lakshmi Suresh, Westford, MA (US); John Watts, Medford, MA (US); Marcelo Blatt, Modiin (IL)

(73) Assignee: EMC Corporation, Hopkinton, MA (US)

( * ) Notice: Subject to any disclaimer, the term of this patent is extended or adjusted under 35 U.S.C. 154(b) by 143 days.

(21) Appl. No.: 14/138,626

(22) Filed: Dec. 23, 2013

(51) Int. Cl.
*G06F 7/04* (2006.01)
*G06F 21/31* (2013.01)

(52) U.S. Cl.
CPC ..................................... *G06F 21/31* (2013.01)

(58) Field of Classification Search
CPC ................................ H04L 63/08; H04L 63/10
USPC ........................................................ 726/2–4
See application file for complete search history.

(56) References Cited

U.S. PATENT DOCUMENTS

| | | | |
|---|---|---|---|
| 7,725,730 B2 | 5/2010 | Juels et al. | |
| 7,739,733 B2 | 6/2010 | Szydlo | |
| 8,955,076 B1 | 2/2015 | Faibish et al. | |
| 9,154,496 B2 | 10/2015 | Juels | |
| 2008/0148366 A1* | 6/2008 | Wahl | 726/4 |
| 2012/0180124 A1* | 7/2012 | Dallas et al. | 726/22 |

* cited by examiner

*Primary Examiner* — Anthony Brown
(74) *Attorney, Agent, or Firm* — BainwoodHuang

(57) ABSTRACT

A technique performs user authentication. The technique involves receiving, by processing circuitry, an authentication request which includes a set of authentication factors and which identifies a particular user. The technique further involves performing, by the processing circuitry, an authentication operation to generate an authentication result in response to the authentication request, the authentication result being based on (i) the set of authentication factors of the authentication request, (ii) a user authentication profile which profiles the particular user, and (iii) a lockout state identifying a lockout condition of the particular user which existed at the time of receiving the authentication request. The technique further involves providing, by the processing circuitry and as a response to the authentication request, an authentication action based on the authentication result.

21 Claims, 6 Drawing Sheets

RISK-BASED AUTHENTICATION USING LOCKOUT STATES

BACKGROUND

A conventional remote server may employ a lockout mechanism which denies login access to an account if a certain number of unsuccessful login attempts are made within a set period of time. For example, suppose that a malicious person attempts to login to an account of a particular person on a remote server. To this end, the malicious person may try different passwords hoping to guess correctly and successfully login. If the limit to number of failed attempts is reached during the set period of time (e.g., three), the remote server locks out the malicious person by preventing further login attempts to that account.

Some conventional remote servers require administrators to manually reset the lockout mechanisms of accounts before the remote servers permit further login attempts to those accounts. Other conventional remote servers require predefined amounts of time to elapse (e.g., an hour, a day, etc.) before permitting further login attempts to those accounts.

SUMMARY

Unfortunately, there are deficiencies to the above-described conventional approaches to locking out accounts in response to unsuccessful login attempts. For example, for conventional remote servers that require administrators to manually reset lockout mechanisms before permitting access to locked out accounts, it can be extremely burdensome and distracting for the administrators to manually reset the lockout mechanisms. Nevertheless, account owners may be anxious to access and inspect their accounts and demand immediate attention.

Additionally, for conventional remote servers that require predefined amounts of time to elapse before permitting access to accounts, the account owners may become frustrated and/or worried having to wait for the predefined amounts of time to elapse before access is permitted again. Moreover, some account owners chronically may be the cause of lockouts (e.g., due to difficulties with certain interfaces such as touch screens, forgetting their own passwords, etc.) thus adding to their frustration.

In contrast to the above-described conventional lockout approaches, improved techniques are directed to performing user authentication based on lockout states. Along these lines, each user has a lockout state (i.e., a persistent lockout condition) such as "locked out", "not locked out", etc. which pertains to standard authentication operations. The action performed for a particular user (e.g., allowing access, denying access, re-challenging, etc.) in response to an authentication attempt can be policy based on and depend on both the current lockout condition as well as other factors. Moreover, the lockout state can be adjusted based on subsequent authentication activity (e.g., unlocked based on a strong successful authentication). Accordingly, lockout behavior (i.e., the authentication response) can be enhanced beyond a conventional rigid heavy-handed approach which simply counts unsuccessful login attempts until the limit is surpassed and then forces the account owner to either wait a predefined amount of time or have the lockout mechanism reset by an administrator.

For example, suppose that a user account is currently in the "locked out" condition due to someone unsuccessfully attempting to authenticate in a standard manner a certain number of times. Here, the authentication server may not rigidly deny access to the user. Rather, the authentication server may continue to consider logins from the user and, in some situations, permit user access, e.g., if the user successfully authenticates using a high trust authentication mechanism such as a one-time passcode from a hardware authenticator. Such operation alleviates any need to wait for a predefined amount of time to elapse or any need to bother an administrator.

Similarly, suppose that a user is currently in the "not locked out" condition and attempts to authenticate using a touch screen device. Additionally, suppose that the touch screen device is on a known device in a safe network (e.g., a tablet connected to a trusted ISP or from a familiar geo-location), and the user has a history of mistyping the password on the initial attempt. Here, the server may operate in a more-forgiving manner by giving the user one or more extra attempts to successfully login before transitioning the user to a "locked out" condition, and so on. Accordingly, the server is able to maintain a strict set of policies regarding login attempts from unknown sources (i.e., potential fraudsters), but impose a set of less aggressive policies for login attempts from a known/bound device.

One embodiment is directed to a method of performing user authentication. The method includes receiving, by processing circuitry, an authentication request which includes a set of authentication factors and which identifies a particular user. The method further includes performing, by the processing circuitry, an authentication operation to generate an authentication result in response to the authentication request, the authentication result being based on (i) the set of authentication factors of the authentication request, (ii) a user authentication profile which profiles the particular user, and (iii) a lockout state identifying a lockout condition of the particular user which existed at the time of receiving the authentication request. The method further includes providing, by the processing circuitry and as a response to the authentication request, an authentication action based on the authentication result.

In some arrangements, the method further includes, based on the authentication result, updating the lockout state to identify an updated lockout condition of the particular user. In these arrangements, the method further includes storing the updated lockout state in non-volatile memory for use in a subsequent authentication operation.

In some arrangements, the method further includes, after updating the lockout state, receiving another authentication request which includes another set of authentication factors and which identifies the particular user. In these arrangements, the method further includes performing another authentication operation to generate another authentication result in response to the other authentication request, the other authentication result being based on (i) the other set of authentication factors of the other authentication request, (ii) the user authentication profile which profiles the particular user, and (iii) the updated lockout state identifying the updated lockout condition of the particular user. Additionally, the method includes providing, as a response to the other authentication request, another authentication action based on the other authentication result.

In some arrangements, updating the lockout state to identify the updated lockout condition includes deriving the updated lockout condition based on (i) the authentication result and (ii) the lockout state identifying the lockout condition of the particular user which existed at the time of receiving the authentication request. Accordingly, the updated lockout condition is based on an earlier lockout condition.

In some arrangements, the authentication request is received from an external device operated by a human attempting to authenticate. In these arrangements, the authentication result includes a numerical risk score which identifies a level of riskiness that the human is not the particular user. Furthermore, in these arrangements, deriving the updated lockout condition includes applying a set of policies to (i) the numerical risk score of the authentication result and (ii) the lockout state identifying the lockout condition of the particular user which existed at the time of receiving the authentication request to establish the updated lockout condition.

It should be understood that such user authentication may involve a risk based engine (e.g., circuitry dedicated to performing risk-based or adaptive authentication) to provide a numerical risk score (i.e., a measure of riskiness that the human authenticating is genuine). Additionally, such authentication may involve a policy engine which applies a set of policies (e.g., to select an action, to select a new lockout condition, etc.). It should be further understood that, in the cloud context, certain electronic circuitry (e.g., hardware of an authentication server) may be formed by remote computer resources distributed over a network. Such a computing environment is capable of providing certain advantages such as enhanced fault tolerance, load balancing, processing flexibility, etc.

Other embodiments are directed to electronic systems and apparatus, processing circuits, computer program products, and so on. Some embodiments are directed to various methods, electronic components and circuitry which are involved in performing user authentication.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Overview

An improved technique is directed to performing user authentication based on lockout states. In particular, each user has a lockout state (i.e., a persistent lockout condition) such as "locked out", "not locked out", etc. which pertains to standard authentication operation. The action performed for a particular user (e.g., allowing access, denying access, re-challenging, etc.) in response to an authentication attempt can be policy based on and depend on both the current lockout condition as well as other factors. Furthermore, the lockout state can be adjusted based on subsequent authentication activity (e.g., unlocked based on strong successful authentication such as a very low risk score). Accordingly, lockout behavior (i.e., the authentication response) can be tailored instead of using a conventional approach which, in a rigid heavy-handed manner, simply counts unsuccessful login attempts until the limit is surpassed and then forces the account owner to either wait a predefined amount of time or have the lockout mechanism reset by an administrator.

Figure 1:
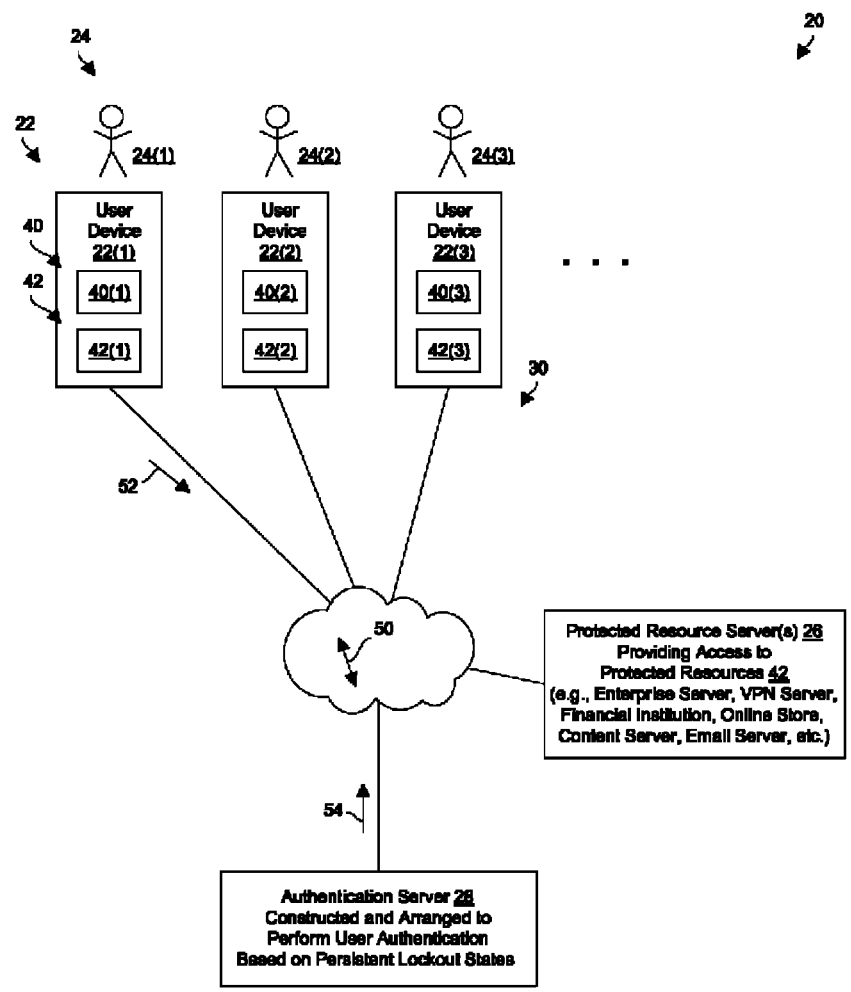
FIG. 1 is a block diagram of an electronic environment which performs user authentication based on lockout states.

FIG. 1 shows an electronic environment 20 which is suitable for performing user authentication based on lockout states. The electronic environment 20 includes user devices 22(1), 22(2), 22(3), . . . (collectively, user devices 22) in possession of their respective users 24(1), 24(2), 24(3), . . . (collectively, users 24), a set of protected resource servers 26 (i.e., one or more protected resource servers 26), an authentication server 28, and a communications medium 30.

Each user device 22 includes a user interface 40 (e.g., a touch screen, a keyboard, mouse, and display, etc.) and a local set of protected resources 42. That is, the user device 22(1) includes a user interface 40(1) and a local set of protected resources 42(1), the user device 22(2) includes a user interface 40(2) and a local set of protected resources 42(2), and so on. The user interface 40 of each user device 22 is constructed and arranged to receive user input from a user 24 and provide user output to the user 24. The set of protected resources 42 of each user device 22 is made available to the user 24 only when the user 24 successfully authenticates. Examples of suitable local protected resources 42 include user access (i.e., unlocking the user devices 22), access to certain apps, contact list access, access to other stored content, access to particular local features such as a camera, a phone, and so on.

The set of protected resource servers 26 maintains other protected resources 42. Such protected resources 42 are capable of being accessed remotely by the user devices 22. Examples of suitable remote protected resources 42 include (among others) accounts and databases of enterprises, VPNs/gateways/other networks, account access and transaction access with banks/brokerages/other financial institutions, transaction access at online stores, databases containing movies/music/files/other content, access to email, access to online games, and so on.

The authentication server 28 performs authentication operations based on lockout states and communicates with the user devices 22 and the set of protected resource servers 26 to control access to the protected resources 42 (e.g., access control agents/apps running on the user devices 22, applications running on the set of protected resource servers 26, etc.). Along these lines, authentication results from the authentication server 28 can be based on (i) a set of authentication factors provided in authentication requests, (ii) user authentication profiles which profile the users 24, and (iii) lockout states identifying lockout conditions of the users 24 which exist at the time of receiving the authentication requests, perhaps among additional data.

The communications medium 30 is constructed and arranged to connect the various components of the electronic environment 20 together to enable these components to exchange electronic signals 50 (e.g., see the double arrow 50). At least a portion of the communications medium 30 is illustrated as a cloud to indicate that the communications medium 30 is capable of having a variety of different topologies including backbone, hub-and-spoke, loop, irregular, combinations thereof, and so on. Along these lines, the communications medium 30 may include copper-based data communications devices and cabling, fiber optic devices and cabling, wireless devices, combinations thereof, etc. Furthermore, the communications medium 30 is capable of supporting LAN-based communications, SAN-based communications, cellular communications, combinations thereof, etc.

During operation, the users 24 operate their respective user devices 22 to perform useful work. Such work may include accessing one or more protected resources 42 (e.g., viewing a file, reading email, performing a banking transaction, etc.). Such operation may involve access to local protected resources 42 of the user devices 22 (e.g., access to run certain apps, unlock access to open the user devices, access to locally stored data, etc.). Alternatively or in combination, such operation may involve access to remote protected resources 42 of the external protected resource servers 26 (e.g., remote login access, remote access to content, ability to complete remote transactions, etc.). Other access control activities include installing apps, connecting to different networks, accessing enterprise resources, and so on. Some user devices 22 may be equipped with special peripherals that enable the users 24 to perform additional operations upon successful authentication such as make cellular calls, navigate using maps and GPS circuitry, take pictures, and so on.

During the course of such operation, the user devices 22 and the authentication server 28 collaborate to control access to the protected resources 42 based on lockout states. As will be explained in further detail shortly, such access control involves risk-based or adaptive authentication which, in response to authentication requests 52, inputs a current lockout condition among other things, and provides a risk score (i.e., a numerical score indicating riskiness that a human attempting to authenticate is genuine). Additionally, such access control involves application of policies to the risk score and to the current lockout condition to select an authentication action 54 (e.g., grant access, deny access, re-challenge, etc.) and to update the lockout condition. Such operation enables the authentication server 28 to provide robust and reliable lockout behavior beyond a conventional rigid behavior (i.e., simply counting unsuccessful login attempts until the limit is surpassed and then forcing the account owner to either wait a predefined amount of time or have the lockout mechanism reset by an administrator).

Authentication Server Details

Figure 2:
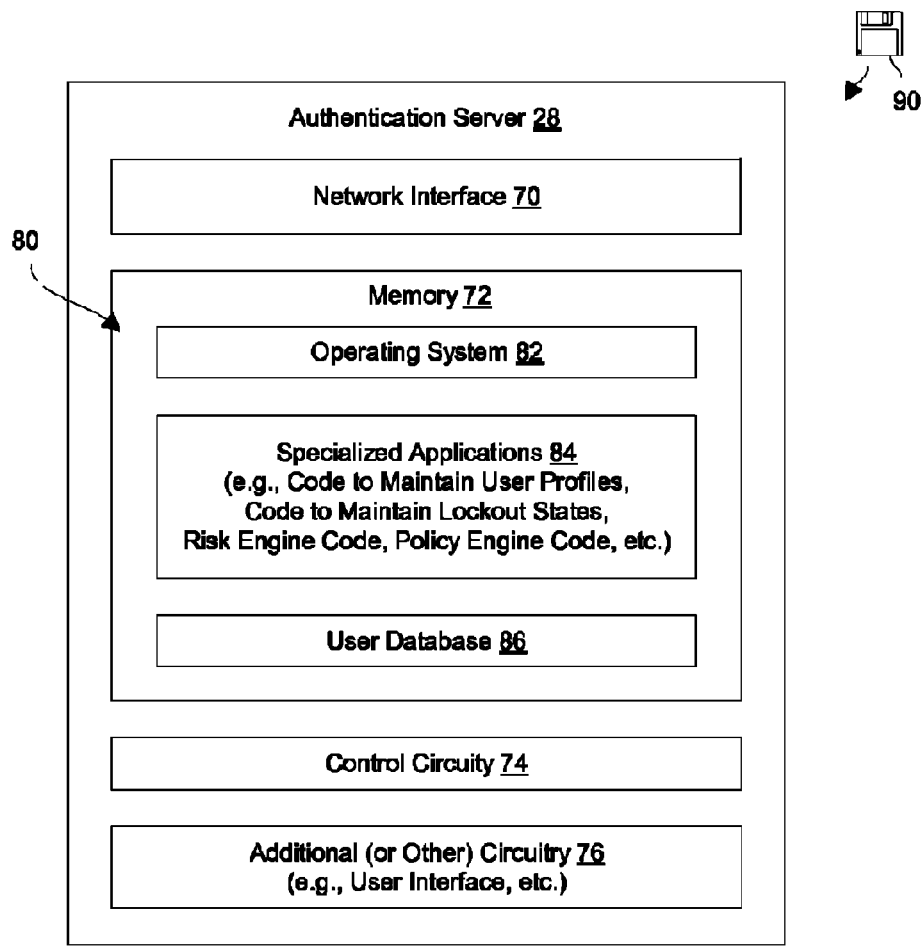
FIG. 2 is a block diagram of an authentication server of the electronic environment of FIG. 1.

FIG. 2 shows particular details of the authentication server 28 of the electronic environment 20. The authentication server 28 includes a network interface 70, memory 72, control circuitry 74, and additional (or other) circuitry 76.

The network interface 70 is constructed and arranged to connect the authentication server 28 to the communications medium 30. Accordingly, the network interface 70 enables the authentication server 28 to communicate with the other components of the electronic environment 20 (FIG. 1). Such communications may be copper-based, fiber-optic-based, or wireless (i.e., IP-based, SAN-based, cellular, Bluetooth, combinations thereof, and so on).

The memory 72 is intended to represent both volatile storage (e.g., DRAM, SRAM, etc.) and non-volatile storage (e.g., flash memory, magnetic disk drives, etc.). The memory 72 stores a variety of software constructs 80 including an operating system 82 to manage the computerized resources of the authentication server 28, specialized applications 84 to form the various circuitry such as code to maintain user profiles, code to maintain lockout states, code to form a risk-engine, code to form a policy engine, and so on), and a user database 86 to hold user information. Such user information can include user details (e.g., a user identifier, a username, contact data, etc.), user privileges (e.g., account information, a list of protected resources 42 which the user 24 owns, etc.), user PINs (or PIN hashes), user secrets/seeds for OTP derivation, user activity history, lockout states, and so on.

The control circuitry 74 is constructed and arranged to operate in accordance with the various software constructs 80 stored in the memory 72. Such circuitry may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 90 is capable of delivering all or portions of the software to the authentication server 28. The computer program product 90 has a non-transitory (or non-volatile) computer readable medium which stores a set of instructions which controls one or more operations of the authentication server 28. Examples of suitable computer readable storage media include tangible articles of manufacture and apparatus which store instructions in a non-volatile manner such as CD-ROM, flash memory, disk memory, tape memory, and the like.

The additional (or other) circuitry 76 is optional and represents additional hardware that can be utilized by the authentication server 28. For example, the authentication server 28 can include a user interface (i.e., a console or terminal) enabling a human administrator to set up new users 24, to deal with alarms or warning messages, to administer routine maintenance, and so on. As another example, a portion of the authentication server 28 may operate as a source for distributing user device code during configuration/enrollment (e.g., an app store, a central app repository, etc.). Other components and circuitry are suitable for use as well.

During operation, the authentication server 28 runs in accordance with the specialized applications 84 to reliably and robustly control access to the protected resources 42 within the electronic environment 20. In particular, the authentication server 28 enrolls users 24 and stores the enrollment data in the user database 86. For example, the authentication server 28 can store, maintain and update the earlier-mentioned user information including lockout states on behalf of the users 24 of the user devices 22. Once the users 24 are properly enrolled, the authentication server 28 responds to authentication requests 52 with authentication actions 54 by adjusting to various risk factors such as current lockout conditions, sensitivity of the protected resources 42 that the users 24 are attempting to access, known failure patterns from different user devices 22, and other behavior information.

In particular, the authentication server 28 is able to maintain, for each user 24, lockout states which pertain to standard authentication operation. For example, with a lockout state indicating that a particular user 24 is currently locked out, the particular user 24 may be unable to access a protected resource 42 via standard authentication (e.g., using a user identifier and password) in accordance with a lockout policy. However, if the user 24 is able to successfully authenticate via a stronger form of authentication (e.g., supplying a one-time use passcode from an authentication token from a known user device 22 in a trusted network), the authentication server 28 can provide the user 24 with the requested access as well as transition the user 24 back to an unlocked condition. Accordingly, the user 24 does not need to bother an administrator or wait for the standard lockout period to expire. Further details will now be provided with reference to FIGS. 3 and 4.

Figure 3:
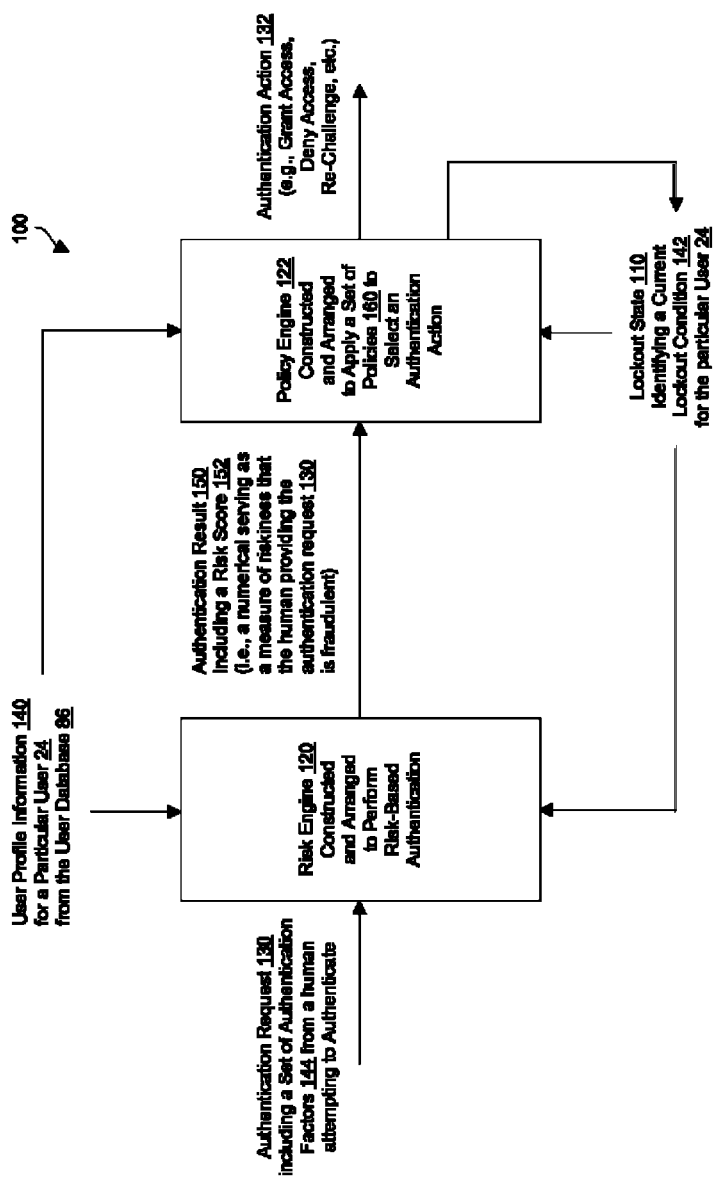
FIG. 3 is a block diagram showing particular operating details of the authentication server of FIG. 2.
Figure 4:
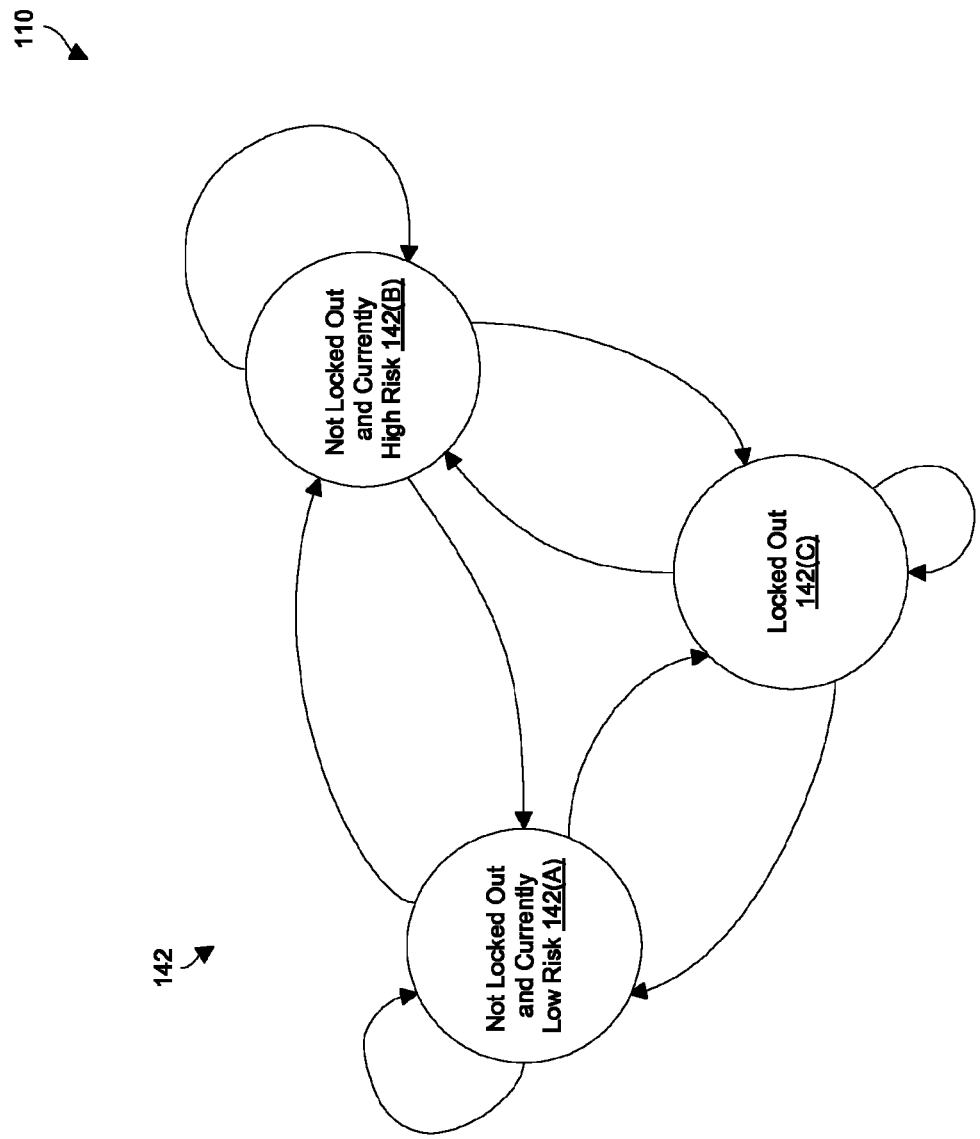
FIG. 4 is an example diagram for a lockout state which is suitable for use by the authentication server of FIG. 2.

FIGS. 3 and 4 show particular details of the authentication server 28 which are involved in authenticating users 24 of the electronic environment 20 (also see FIG. 1). FIG. 3 shows particular processing components 100 of the authentication server 28. FIG. 4 shows an example diagram for a lockout state 110 which is suitable for use by the authentication server 28 in identifying a current lockout condition pertaining to standard authentication operation.

As shown in FIG. 3, the processing components 100 include a risk engine 120 and a policy engine 122 which are arranged in a pipelined configuration. The risk engine 120 provides for effective evaluation of riskiness based on a variety of authentication factors. The policy engine 122 enables intelligent action selection and management of lockout states 110 based on output from the risk engine 120. In some arrangements, the control circuitry 74 of the authentication server 28 forms the risk engine 120 and the policy engine 122 by executing code of the specialized applications 84 stored in the memory 72 (also see FIG. 2).

During operation, the particular processing components 100 receive authentication requests 130 and provide authentication actions 132 in response to the authentication requests 130. In particular, for each authentication request 130, the risk engine 120 inputs (i) user profile information 140 for a particular user 24, (ii) a lockout state 110 identifying a current lockout condition 142 for the particular user 24, and (iii) the authentication request 130 which includes a set of authentication factors 144 (also see arrow 52 in FIG. 1). The risk engine 120 may input other information as well such as time of day, network conditions, general risk levels of particular servers, and so on.

Based on the inputs to the risk engine 120, the risk engine 120 outputs an authentication result 150 to the policy engine 122. The authentication result 150 includes a numerical risk score 152 identifying a measure of riskiness that the source of the authentication request 130 is a fraudster. Along these lines, a low score means low risk and serves as a good indication that the human attempting to authenticate is genuine. On the other hand, a high score means high risk, i.e., likely that the authentication request 130 is not from the legitimate user 24.

The policy engine 122 then inputs (i) the user profile information 140 for the particular user 24, (ii) the lockout state 110 identifying the current lockout condition 142 for the particular user 24, and (iii) the authentication result 150 which includes the risk score 152 (perhaps among other information from the risk engine 120), and applies a set of policies 160 to these inputs to select a suitable authentication action 132. Once the authentication action 132 is selected, the authentication action 132 is carried out as a response to the authentication request 130. Example authentication actions 132 include granting the particular user 24 with access to a requested set of protected resources 42 (FIG. 1), denying access to the set of protected resources 42, providing a challenge using a form of authentication which is stronger than the standard form of authentication (e.g., prompting for a one-time use passcode from an authentication token instead of prompting for a simple PIN or a static password, etc.), and so on.

Additionally, the policy engine 122 updates the lockout state 110 for use in responding to the next authentication request 130 for the particular user 24. In particular, policy engine 122 applies the set of policies 160 to the inputs to the policy engine 122 to select an appropriate lockout condition 142 for the lockout state 110 of the particular user 24. For example, the policy engine 122 can transition the lockout state 110 from one lockout condition 142 to another lockout condition 142. Alternatively, the policy engine 122 can maintain the same lockout condition 142, and so on.

As shown in FIG. 4, the example lockout conditions 142 for the lockout state 110 for the particular user 24 include a "not locked out and currently low risk" condition 142(A), a "not locked out and currently high risk" condition 142(B), and a "locked out" condition 142(C). The "not locked out and currently low risk" condition 142(A) indicates a current low risk situation in which the particular user 24 is not locked out from a standard authentication standpoint (i.e., the particular user 24 cannot gain access to a protected resource 42 via a standard authentication mechanism). The "not locked out and currently high risk" condition 142(B) indicates a high risk situation but the particular user 24 is still not locked out from a standard authentication standpoint. The "locked out" condition 142(C) indicates a situation in which the particular user 24 is locked out from a standard authentication standpoint. The arrows between the various lockout conditions 142 indicate transitions from one lockout condition 142 to another lockout condition 142, or to the same lockout condition 142, which are possible when the processing components 100 process an authentication request 130.

It should be understood that the configuration for lockout conditions 142 illustrated by the state diagram of FIG. 4 is provided by way of example only, and that other configurations for the lockout conditions 142 are suitable for use. For example, there could be other lockout conditions 142 such as a "not locked out and currently moderate risk" condition. As another example, the "locked out" condition could be replaced with a "locked out and currently low risk" condition, a "locked out and currently moderate risk" condition, a "locked out and currently high risk" condition. As yet another example, other conditions could be added such as a "locked out due to enterprise lockout" condition, a "locked out due to global lockout" condition, and so on.

In some arrangements, the universe of lockout conditions 142 can be viewed as a Markov chain, i.e., a system which undergoes transitions from one condition (or state) to another in a state space. Additionally, the set of policies 160 applied to the authentication results 150 and lockout states 110 determine the probability of transitioning from a particular lockout condition 142 to another lockout condition 142 or to the same lockout condition 142. In some arrangements, a particular lockout conditions 142 is prevented from transitioning to certain other lockout conditions 142 (e.g., based on the application of the set of policies 160).

At this point, it should be understood that, with the techniques disclosed herein, the process of locking out or not locking out a particular user 24 is less rigid than conventional lockout approaches that simply impose a lockout time period or require an administrative reset once a set number of login failures have been encountered. Rather, with the improved techniques, the authentication server 28 is able to tailor an intelligent and appropriate authentication action 132 based on a variety of information at hand. That is, for each authentication request 130, the risk engine 120 evaluates and generates a risk score 152. Additionally, for each authentication request 130, the policy engine 122 provides an authentication action 132 based on that risk score 152. In particular, the policy engine 122 is able to apply the set of policies 160 to a variety of factors: the user profile information 140 for the particular user 24, the authentication result 150, and the current lockout condition 142 of the lockout state 110 for the particular user to select an appropriate authentication action 132. As a result of such operation, a particular user 24 may not be rigidly locked out from accessing a set of protected resources 42 even though the particular user 24 has failed authentication several times.

Several examples will now be provided to illustrate the advantages of the techniques disclosed herein. As will be explained in further detail below, such techniques are able to avoid being too sensitive (e.g., where authentication is too challenging and too many legitimate users 24 are locked out). Additionally, such techniques are able to avoid being too lenient (e.g., where authentication is too relaxed so that a hacker is able to easily defeat authentication).

Example 1

Suppose that the authentication server 28 currently maintains a lockout state 110 at the "not locked out and currently low risk" condition 142(A) for a particular user 24 (also see FIG. 4). Additionally, suppose that the authentication server 28 receives an authentication request 130 to access a set of protected resources 42 of the particular user 24 (also see FIGS. 1 and 3). Furthermore, based on a comparison of available user profile information 140 (also see the user database 86 in FIG. 2) and authentication factors 144 of the authentication request 130, suppose that the authentication server 28 determines that the authentication request 130 is from a new user device 22 in an unknown network.

In this situation, the risk engine 120 performs a risk-based evaluation (e.g., an adaptive authentication operation) which provides an authentication result 150 including a risk score 152 (FIG. 2). The risk score 152 is based on a variety of inputs including the lockout state 110 which has the "not locked out and currently low risk" condition 142(A).

Due to significant differences in the current behavior from previous behavior of the particular user 24 and perhaps incorrect PIN or password matching, the risk score 152 may be relatively high indicating a high level of risk that the authentication request 130 is fraudulent. In particular, the possibility exists that an imposter (or bot) is trying to obtain access to the set of protected resources 42 of the particular user 24.

The policy engine 122 inputs the authentication result 150 including the risk score 152, the user profile information 140 and the lockout state 110 for the particular user 24, and (i) determines an authentication action 132 and (ii) updates the lockout state 110 based on application of the set of policies 160. Since the lockout state 110 for the particular user 24 has a "not locked out and currently low risk" condition 142(A), the policy engine 122 may (i) deny access (or re-challenge) and (ii) transition the lockout condition 142 of the lockout state 110 from the "not locked out and currently low risk" condition 142(A) to the "not locked out and currently high risk" condition 142(B). Accordingly, the authentication server 28 has effectively denied access to the protected resource 42, but has not locked out the particular user 24.

Now, after receiving the first authentication request 130 and denying access in response to the first authentication request 130, suppose that the authentication server 28 receives another authentication request 130 to access the set of protected resources 42 of the particular user 24 from the same new user device 22 in the unknown network. Again, the authentication server 28 generates an authentication result 150 based on a variety of inputs which now includes the "not locked out and currently high risk" condition 142(B). Furthermore, the authentication server 28 may adjust the risk score 152 based on the velocity of the authentication requests 130 for the particular user 24 (e.g., based on whether the time separation between authentication requests 130 is normal or extremely short).

In this situation, suppose that the time separation is normal and that the genuine user 24 is simply trying to authenticate from an unfamiliar device or a new location and has correctly typed the proper PIN or password during this authentication attempt (e.g., the user 24 may have struggled with the user interface during the first attempt and mistyped the PIN). As a result, suppose that the risk engine 120 provides a new risk score 152 which is very low and much lower than that of the first authentication result 150.

Next, the policy engine 122 inputs the authentication result 150 and the "not locked out and currently high risk" condition 142(B) (perhaps with other information), and outputs (i) another authentication action 132 and (ii) an updated lockout state 110. In this situation, since the risk score 152 is very low, the policy engine 122 may grant access to the set of protected resources 42. Additionally, in this situation, the policy engine 122 can maintain the lockout state 110 at the "not locked out and currently high risk" condition 142(B) or transition to the "not locked out and currently high risk" condition 142(A) based on application of the set of policies 160. Accordingly, the authentication server 28 is able to intelligently control access to both the set of protected resource 42 and the lockout behavior for the particular user 24.

Alternatively, suppose that the second authentication attempt 130 was received with abnormally high velocity (e.g., perhaps indicating a bot) from the unknown user device 22 from the unknown network. Further suppose that the second authentication request 130 to access the set of protected resources 42 of the particular user 24 again included an incorrect PIN. Here, the authentication server 28 generates an authentication result 150 based on a variety of inputs which includes the "not locked out and currently high risk" condition 142(B) and an authentication result 150 having a very high risk score 152. That is, the authentication server 28 may have adjusted the risk score 152 to reflect high risk based on the high velocity of the authentication requests 130, the unknown hardware, and the incorrect PIN.

In this situation, not only can the policy engine 122 deny access to the set of protected resources 42, the policy engine 122 can transition the lockout state 110 to the "locked out" condition 142(C) to prevent access to the set of protected resources 42 in response to future standard authentication attempts. Specifically, the policy engine 122 may have determined that the series of authentication requests 130 is a malicious attempt and decide to prevent all further authentication attempts using standard authentication methods for a period of time. Along these lines, the authentication server 28 can be configured to deny further standard authentication requests 130 for an amount of time (e.g., a hour, etc.). If the risk score is very high, the authentication server 28 may further adjust (e.g., lengthen) the lockout time or impose a requirement that an administrator reset the lockout state 110.

It should be understood that the authentication server 28 can still allow the legitimate user 24 to access the set of protected resources 42 even though the lockout state 110 for the particular user 24 is now set to the "locked out" condition 142(C). In particular, suppose that the particular user 24 attempts to authenticate from a known device 22 in a trusted network using a strong form of authentication such as by submitting a valid one-time use passcode (OTP). In this situation, the particular user 24 may be able to obtain an extremely low risk score 152 from the risk engine 120. As a result, the particular user 24 is able to obtain access to the set of protected resources 42 as well as cause the authentication server 28 to transition the lockout state 110 back to the "not locked out and currently high risk" condition 142(B) to re-enable use of standard authentication (i.e., "unlock" from the "locked out" condition 142(C)). Such operation is more flexible than a conventional rigid lockout since such operation enables the user 24 to reset without waiting for the period of time to expire and without the user 24 needing to obtain assistance from an administrator. Moreover, the particular actions and activities of the authentication server 28 can be tailored/customized for various situations by modifying the set of policies 160.

Example 2

Suppose that the authentication server 28 currently maintains a lockout state 110 at the "not locked out and currently low risk" condition 142(A) for a particular user 24 (also see FIG. 4). Additionally, suppose that authentication server 28 receives an authentication request 130 from the genuine user 24 who has a tendency to mistype a PIN or password. Furthermore, suppose that the authentication server 28 is able to determine from the user profile information 140 (FIG. 3) that the user 24 frequently mistypes the PIN or password (e.g., due to issues with a touch screen).

In this situation, the risk score 152 of the authentication result 150 may be high due to submission of an incorrect PIN or password. However, the policy engine 122 may see that, based on the lockout state 110 for the particular user 24 being at the "not locked out and currently low risk" condition 142 (A) state, the policy engine 122 may deny access but maintain the lockout state 110 at the "not locked out and currently low risk" condition 142(A).

Such operation effectively discounts the mistyped PIN or password. This less aggressive operation is more forgiving than a conventional rigid lockout approach which simply counts the number of failed lockout attempts before locking out because this less aggressive operation may provide the particular user 24 with additional tries before stepping up security. For example, the authentication server 28 may normally transition to the "locked out" condition 142(C) after three failed attempts if the authentication requests 130 came from an unknown device with a keyboard interface (see user interfaces 40 in FIG. 1). However, the authentication server 28 may provide additional authentication attempts if the authentication requests 130 come from a known/bound device with a touch screen that the particular user 24 has a tendency to struggle with.

Example 3

Suppose that the authentication server 28 currently maintains a lockout state 110 at the "not locked out and currently low risk" condition 142(A) for a particular user 24. Even in such a low risk initial condition, there may be certain situations in which the authentication server 28 imposes a strict lockout behavior.

In particular, using risk-based evaluation in combination with persistent lockout states 110, the authentication server 28 is able to treat certain unsuccessful authentication attempts more aggressively such as those from a new or unknown device 22, those trying to access a particularly sensitive resource 42 (e.g., a high dollar amount transaction), those from known bad internet service provider (ISP), i.e., a blacklist, and so on. Accordingly, the authentication server 28 is able to provide more intelligent behavior than a conventional rigid approach that simply counts failed lockout attempts in a vacuum.

Further Details

In some situations, the authentication server 28 can receive authentication requests directly from the user devices 22. For example, users 24 may need to authenticate with the authentication server 28 in order to obtain access to local protected resources 42 on their user devices 22. Additionally, users 24 may need to authenticate with the authentication server 28 when the authentication server 28 operates as a front-end to control access to back-end protected resources 42 (e.g., enterprise access, VPN access, access to remote content, etc.).

Figure 5:
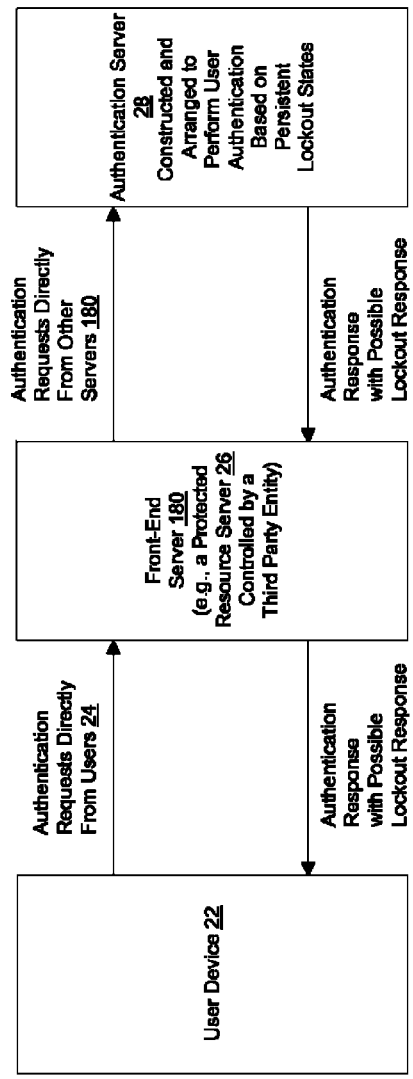
FIG. 5 is a block diagram of a scenario which involves a protected resource server and the authentication server of FIG. 2.

FIG. 5 shows a scenario which involves a front-end server 180 and the authentication server 28 operating in the background (i.e., transparently to the users 24). For example, the front-end server 180 may be a protected resource server 26 (also see FIG. 1) such as a gateway, an online store, a bank, and so on. Here, the operator of the protected resource server 26 (e.g., a third-party entity or organization) can rely on the authentication server 28 to provide enhanced authentication services.

Along these lines, the front-end server 180 may impose a preliminary authentication process directly on the users 24. For example, the front-end server 180 may perform an initial authentication operation such as evaluate a user identifier (e.g., a user ID) and a user PIN. If such initial authentication is unsuccessful, the front-end server 180 may immediately deny access. Additionally, the front-end server 180 may impose its own lockout mechanism such as a conventional lockout approach which rigidly locks out users 24 after a certain number of unsuccessful authentication attempts (e.g., three).

However, if initial authentication is successful, the front-end server 180 may send an authentication request to the authentication server 28 to obtain enhanced authentication based on lockout states. Such an authentication request may be sent to the authentication server 28 as part of the initial authentication process (e.g., after the front-end server 180 has successfully matched the user ID and user PIN), or separately after the user 24 has gained access into the front-end server 180 for some period of time (e.g., later to complete a transaction). Here, the authentication server 28 provides, as an authentication action, a response to the front-end server 180 rather than directly to the user device 22 (i.e., the front-end server 180 is the client to the authentication server 28).

Accordingly, the above-described operation is well suited for integrating with existing infrastructure and legacy equipment. Furthermore, such operation can be made transparent to the user devices 22. In some situations, any lockout system that is imposed by the front-end server 180 can take input from the authentication server 28 in order to adjust the lockout behavior of the front-end server 180.

Figure 6:
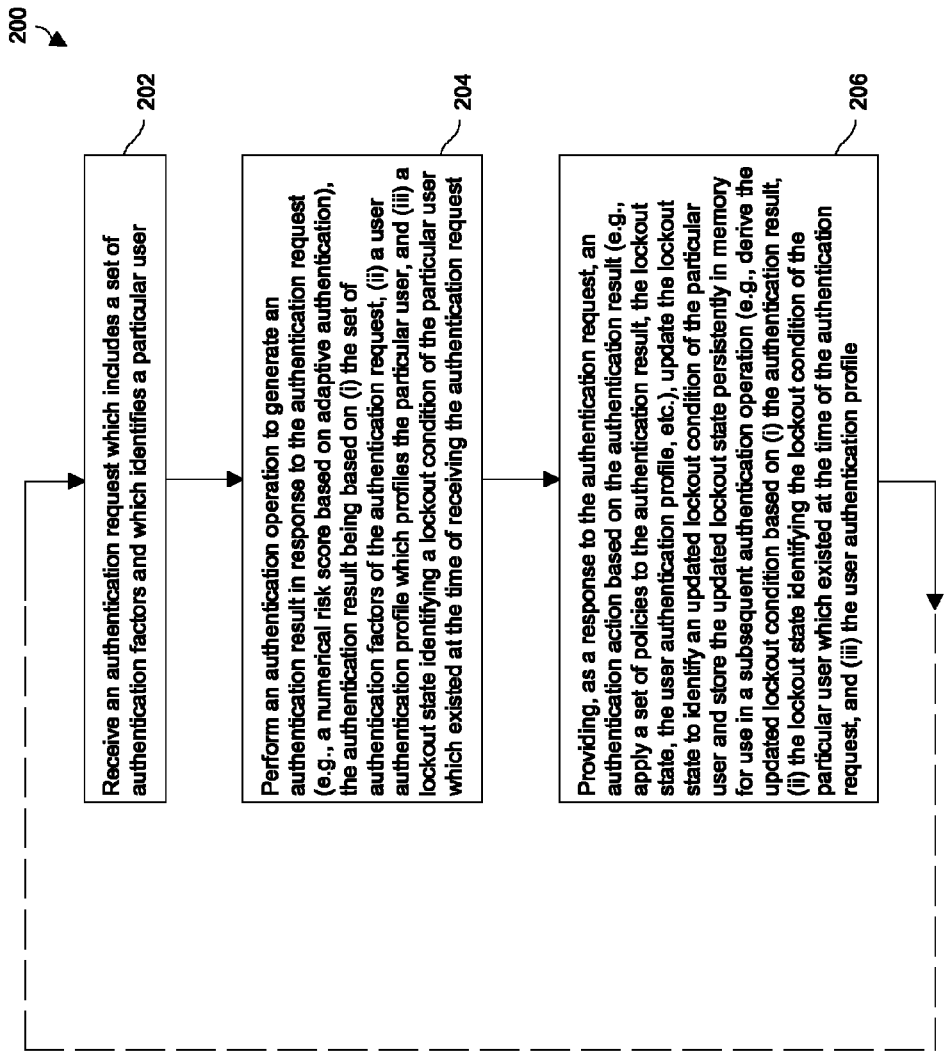
FIG. 6 is a flowchart of a procedure which is performed by the authentication server of FIG. 2.

FIG. 6 is a flowchart of a procedure 200 which is performed by the authentication server 28. At 202, the authentication server 28 receives an authentication request which includes a set of authentication factors and which identifies a particular user (also see FIG. 1). For example, the authentication request may originate from a user device 22 or from a front-end server 180.

At 204, the authentication server 28 performs an authentication operation to generate an authentication result in response to the authentication request. The authentication result is based on (i) the set of authentication factors of the authentication request, (ii) a user authentication profile which profiles the particular user, and (iii) a lockout state identifying a lockout condition of the particular user which existed at the time of receiving the authentication request. In some arrangements, the authentication request includes a numerical risk score (e.g., an output of adaptive authentication) which identifies riskiness that the authentication request is from a fraudster.

At 206, the authentication server 28 provides, as a response to the authentication request, an authentication action based on the authentication result. Additionally, the authentication server 28 updates a lockout state to identify an updated lockout condition of the particular user (e.g., derives the updated lockout condition from the authentication result, the previous lockout state and the user authentication profile, and stores the state in memory).

After the authentication server 28 completes the procedure 200, the authentication server 28 can re-perform the procedure 200 for another authentication request. This possible repetitive operation is illustrated by the dashed lines which show the ability to repeat the procedure 200. It should be understood that additional steps/operations/etc. can be included as well. Accordingly, the authentication server 28 is able to base its operation on multiple authentication requests for the same user (e.g., velocity information), as well as on other authentication activity (e.g., authentication results for other users 24).

As described above, improved techniques are directed to performing user authentication based on lockout states 110. Along these lines, each user 24 has a lockout state (i.e., a persistent lockout condition 142) such as "locked out", "not locked out", etc. which pertains to standard authentication. The action performed for a particular user 24 (e.g., allowing access, denying access, re-challenging, etc.) in response to an authentication attempt can be policy based and depend on both the current lockout condition 142 as well as other factors. Moreover, the lockout state 110 can be adjusted based on subsequent authentication activity (e.g., unlocked based on a strong successful authentication). Accordingly, lockout behavior (i.e., the authentication response) can be enhanced beyond a conventional rigid heavy-handed approach which simply counts unsuccessful login attempts until the limit is surpassed and then forces the account owner to either wait a predefined amount of time or have the lockout mechanism reset by an administrator.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the electronic environment 20 such as the servers are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

Additionally, it should be understood that the above-described pipeline arrangement of the risk engine 120 and the policy engine 122 (FIG. 4) is a particular configuration which is suitable for use, but other configurations are suitable for use as well. Furthermore, such circuits can be formed via processing circuitry which involves machine learning, fuzzy logic, neural nets, policies/rules, Markov chains, combinations thereof, and so on.

Moreover, from an administrative perspective, control can be made as simple as a sliding ruler (e.g., low, medium and high settings). Also, in contrast to conventional rigid approaches, the above-described lockout system is able to unlock (i.e., re-enable standard user authentication) based on low risk scores, and so on.

One should appreciate that, for each user 24, such operation enables the authentication server 28 to profile facts such as the number of failed attempts, days (or minutes) since the user 24 was locked out, and so on. Such operation also adjusts for other risk factors such as the sensitivity of the resources 42 the user 24 is trying to access, known failure patterns from different user devices 22, other user behavior information, and so on. When a user 24 authenticates, the event can be profiled. When the number of failed attempts reaches the risk engine's threshold, it can be flagged as an anomaly thereby increasing the risk score for this entity/group. Such operation can contribute to the overall risk score and can be used to "block" the user 24. It may also serve to "unlock" the user 24 if a set of conditions such as receiving, as the next authentication request, a high trust authenticator such as a correct one-time use passcode from an authentication token issued to the genuine user 24. Furthermore, the amounts of time a user 24 is placed in a "locked out" condition 142 can be made proportional to other risk factors such as the resource 42 that the user 24 is attempting to access, the overall risk measured when the lockout decision was made, and so on.

Furthermore, it should be understood that in some arrangements the set of policies 160 applied by the policy engine 122 (FIG. 3) consider some factors rather than others, or weight certain factors over others. For example, in one arrangement, the authentication result 150 includes multiple risk scores 152, and these multiple risk scores 152 can be considered separately or in the aggregate.

In a particular arrangement, the factors are considered individually when determining the revised lockout state 110. For example, the authentication result 150 can include a "device risk" factor/score (e.g., user never authenticated from this device before) and a "user risk" factor/score (e.g. user has never accessed this resource before). In this situation, the user risk could contribute more than device risk to user lockout. Other ways of updating the lockout state 110 based on a set of risk scores 152 are suitable for use as well. Such modifications and enhancements are intended to belong to various embodiments of the disclosure.

What is claimed is:

1. A method of performing user authentication, the method comprising:
receiving, by processing circuitry, an authentication request which includes a set of authentication factors and which identifies a particular user;
performing, by the processing circuitry, an authentication operation to generate an authentication result in response to the authentication request, the authentication result being based on (i) the set of authentication factors of the authentication request, (ii) a user authentication profile which profiles the particular user, and (iii) a lockout state identifying a lockout condition of the particular user which existed at the time of receiving the authentication request;
providing, by the processing circuitry and as a response to the authentication request, an authentication action based on the authentication result;
based on the authentication result, updating the lockout state to identify an updated lockout condition of the particular user;
storing the updated lockout state in non-volatile memory for use in a subsequent authentication operation;

after updating the lockout state, receiving another authentication request which includes another set of authentication factors and which identifies the particular user;
performing another authentication operation to generate another authentication result in response to the other authentication request, the other authentication result being based on (i) the other set of authentication factors of the other authentication request, (ii) the user authentication profile which profiles the particular user, and (iii) the updated lockout state identifying the updated lockout condition of the particular user; and
providing, as a response to the other authentication request, another authentication action based on the other authentication result;
wherein the lockout state indicates a "locked out" condition prior to performing the authentication operation, the "locked out" condition preventing the particular user from accessing a set of protected resources even upon successful standard authentication; and
wherein updating the lockout state to identify the updated lockout condition of the particular user includes:
after performing the authentication operation, setting the lockout state to indicate a "not locked out" condition to allow the particular user to access the set of protected resources upon successful standard authentication.

2. A method as in claim 1, further comprising
after performing the other authentication operation, setting the lockout state to continue to indicate the "not locked out" condition.

3. A method as in claim 1, further comprising:
after performing the other authentication operation, setting the lockout state to continue to indicate the "locked out" condition.

4. A method as in claim 1 wherein the authentication request is received from an external device operated by a human attempting to authenticate;
wherein the authentication result includes a set of numerical risk scores which identifies a level of riskiness that the human is not the particular user; and
wherein updating the lockout state to identify the updated lockout condition further includes deriving the updated lockout condition based on (i) the set of numerical risk scores of the authentication result and (ii) the lockout state identifying the lockout condition of the particular user which existed at the time of receiving the authentication request.

5. A method as in claim 1 wherein updating the lockout state to identify the updated lockout condition further includes:
deriving the updated lockout condition based on (i) the authentication result and (ii) the lockout state identifying the lockout condition of the particular user which existed at the time of receiving the authentication request.

6. A method as in claim 5 wherein the authentication request is received from an external device operated by a human attempting to authenticate;
wherein the authentication result includes a set of numerical risk scores which identifies a level of riskiness that the human is not the particular user; and
wherein deriving the updated lockout condition includes applying a set of policies to (i) the set of numerical risk scores of the authentication result and (ii) the lockout state identifying the lockout condition of the particular user which existed at the time of receiving the authentication request to establish the updated lockout condition.

7. A method as in claim 5 wherein the authentication request is received from an external device operated by a human attempting to authenticate;
wherein the authentication result includes a set of numerical risk scores which identifies a level of riskiness that the human is not the particular user; and
wherein updating the lockout state to identify the updated lockout condition includes selecting, as the updated lockout condition, a particular predefined lockout condition from a set of predefined lockout conditions based on (i) the set of numerical risk scores of the authentication result and (ii) the lockout state identifying the lockout condition of the particular user which existed at the time of receiving the authentication request.

8. A method as in claim 5 wherein the authentication request is received from an external device operated by a human attempting to authenticate;
wherein the authentication result includes a set of numerical risk scores which identifies a level of riskiness that the human is not the particular user; and
wherein providing the authentication action includes selecting, as the authentication action, a particular predefined action from a set of predefined actions based on applying a set of policies to (i) the set of numerical risk scores of the authentication result and (ii) the lockout state identifying the lockout condition of the particular user which existed at the time of receiving the authentication request.

9. A method as in claim 8 wherein updating the lockout state to identify the updated lockout condition includes selecting, as the updated lockout condition, a particular predefined lockout condition from a set of predefined lockout conditions based on (i) the set of numerical risk scores of the authentication result and (ii) the lockout state identifying the lockout condition of the particular user which existed at the time of receiving the authentication request.

10. A method as in claim 9 wherein the lockout state identifying the lockout condition of the particular user which existed at the time of receiving the authentication request is a "locked out" condition preventing the particular user from accessing a set of protected resources during an amount of time even upon successful standard authentication;
wherein selecting the particular predefined action from the set of predefined actions includes choosing, in response to successful high-trust authentication which imposes stronger security than standard authentication, a resource grant action which grants the human access to the set of protected resources before the amount of time has elapsed; and
wherein selecting, as the updated lockout condition, a particular predefined lockout condition from the set of predefined lockout conditions includes choosing, in response to the successful high-trust authentication, the "not locked out" condition allowing the particular user to access the set of protected resources upon successful standard authentication.

11. An electronic apparatus, comprising:
a communications interface;
memory; and
control circuitry coupled to the communications interface and the memory, the memory storing instructions which, when carried out by the control circuitry, cause the control circuitry to:

receive an authentication request which includes a set of authentication factors and which identifies a particular user, perform an authentication operation to generate an authentication result in response to the authentication request, the authentication result being based on (i) the set of authentication factors of the authentication request, (ii) a user authentication profile which profiles the particular user, and (iii) a lockout state identifying a lockout condition of the particular user which existed at the time of receiving the authentication request, wherein the lockout state indicates a "locked out" condition prior to performing the authentication operation, the "locked out" condition preventing the particular user from accessing a set of protected resources even upon successful standard authentication, provide, as a response to the authentication request, an authentication action based on the authentication result, and after performing the authentication operation, setting the lockout state to indicate a "not locked out" condition to allow the particular user to access the set of protected resources upon successful standard authentication.

12. An electronic apparatus as in claim 11 wherein the control circuitry is constructed and arranged to:

based on the authentication result, update the lockout state to identify an updated lockout condition of the particular user, and store the updated lockout state in the memory for use in a subsequent authentication operation.

13. An electronic apparatus as in claim 12 wherein the control circuitry is further constructed and arranged to:

after updating the lockout state, receive another authentication request which includes another set of authentication factors and which identifies the particular user, and perform another authentication operation to generate another authentication result in response to the other authentication request, the other authentication result being based on (i) the other set of authentication factors of the other authentication request, (ii) the user authentication profile which profiles the particular user, and (iii) the updated lockout state identifying the updated lockout condition of the particular user; and provide, as a response to the other authentication request, another authentication action based on the other authentication result;

wherein the authentication request is received from an external device operated by a human attempting to authenticate;

wherein the authentication result includes a set of numerical risk scores which identifies a level of riskiness that the human is not the particular user; and wherein updating the lockout state to identify the updated lockout condition includes deriving the updated lockout condition based on (i) the set of numerical risk scores of the authentication result and (ii) the lockout state identifying the lockout condition of the particular user which existed at the time of receiving the authentication request.

14. A computer program product having a non-transitory computer readable medium which stores a set of instructions to provide user authentication, the set of instructions, when carried out by computerized circuitry, causing the computerized circuitry to perform a method of:

receiving an authentication request which includes a set of authentication factors and which identifies a particular user;

performing an authentication operation to generate an authentication result in response to the authentication request, the authentication result being based on (i) the set of authentication factors of the authentication request, (ii) a user authentication profile which profiles the particular user, and (iii) a lockout state identifying a lockout condition of the particular user which existed at the time of receiving the authentication request, wherein the lockout state indicates a "locked out" condition prior to performing the authentication operation, the "locked out" condition preventing the particular user from accessing a set of protected resources even upon successful standard authentication;

providing, as a response to the authentication request, an authentication action based on the authentication result; and after performing the authentication operation, setting the lockout state to indicate a "not locked out" condition to allow the particular user to access the set of protected resources upon successful standard authentication.

15. A computer program product as in claim 14 wherein the method further comprises:

based on the authentication result, updating the lockout state to identify an updated lockout condition of the particular user; and storing the updated lockout state in non-volatile memory for use in a subsequent authentication operation.

16. A method as in claim 1 wherein (i) the authentication request is received from a first user device and (ii) performing the authentication operation includes applying a first lockout policy that imposes a first set of lockout criteria to generate the authentication result; and wherein (i) the other authentication request is received from a second user device and (ii) performing the other authentication operation includes applying a second lockout policy that imposes a second set of lockout criteria to generate the other authentication result, the first set of lockout criteria being stricter than the second set of lockout criteria.

17. A method as in claim 1 wherein (i) the authentication request is received from a user device while the user device resides in a first location and (ii) performing the authentication operation includes applying a first lockout policy that imposes a first set of lockout criteria to generate the authentication result; and wherein (i) the other authentication request is received from the user device while the user device resides in a second location that is different from the first location and (ii) performing the other authentication operation includes applying a second lockout policy that imposes a second set of lockout criteria to generate the other authentication result, the first set of lockout criteria being stricter than the second set of lockout criteria.

18. An electronic apparatus as in claim 11 wherein (i) the authentication request is received from a first user device and (ii) the control circuitry, when performing the authentication operation, is constructed and arranged to apply a first lockout policy that imposes a first set of lockout criteria to generate the authentication result; and wherein the control circuitry is further constructed and arranged to (i) receive another other authentication request from a second user device and (ii) perform another authentication operation that applies a second lockout policy imposing a second set of lockout criteria to generate another authentication result, the first set of lockout criteria being stricter than the second set of lockout criteria.

19. An electronic apparatus as in claim 11 wherein (i) the authentication request is received from a user device while the user device resides in a first location and (ii) the control circuitry, when performing the authentication operation, is constructed and arranged to apply a first lockout policy that imposes a first set of lockout criteria to generate the authentication result; and wherein the control circuitry is further constructed and arranged to (i) receive another other authentication request from the user device while the user device resides in a second location that is different from the first location and (ii) perform another authentication operation that applies a second lockout policy imposing a second set of lockout criteria to generate another authentication result, the first set of lockout criteria being stricter than the second set of lockout criteria.

20. A computer program product as in claim 14 wherein (i) the authentication request is received from a first user device and (ii) performing the authentication operation includes applying a first lockout policy that imposes a first set of lockout criteria to generate the authentication result; and wherein the method further includes (i) receiving another authentication request from a second user device and (ii) performing another authentication operation that applies a second lockout policy imposing a second set of lockout criteria to generate another authentication result, the first set of lockout criteria being stricter than the second set of lockout criteria.

21. A computer program product as in claim 14 wherein (i) the authentication request is received from a user device while the user device resides in a first location and (ii) performing the authentication operation includes applying a first lockout policy that imposes a first set of lockout criteria to generate the authentication result; and wherein the method further includes (i) receiving another authentication request from the user device while the user device resides in a second location that is different from the first location and (ii) performing another authentication operation that applies a second lockout policy imposing a second set of lockout criteria to generate another authentication result, the first set of lockout criteria being stricter than the second set of lockout criteria.

* * * * *